US009794301B1

(12) United States Patent
Urbach

(10) Patent No.: US 9,794,301 B1
(45) Date of Patent: Oct. 17, 2017

(54) TELEPHONE SESSION INITIATION SYSTEM

(71) Applicant: Noam Urbach, Petach Tikva, IL (US)

(72) Inventor: Noam Urbach, Petach Tikva, IL (US)

( * ) Notice: Subject to any disclaimer, the term of this patent is extended or adjusted under 35 U.S.C. 154(b) by 0 days.

(21) Appl. No.: 14/298,913

(22) Filed: Jun. 7, 2014

Related U.S. Application Data

(60) Provisional application No. 61/832,222, filed on Jun. 7, 2013.

(51) Int. Cl.
| | | |
|---|---|---|
| *H04M 1/00* | (2006.01) |
| *H04M 3/00* | (2006.01) |
| *H04M 3/42* | (2006.01) |
| *H04L 29/06* | (2006.01) |
| *H04M 15/08* | (2006.01) |
| *H04M 15/10* | (2006.01) |
| *H04M 7/00* | (2006.01) |

(52) U.S. Cl.
CPC ........ *H04L 65/1069* (2013.01); *H04M 7/006* (2013.01); *H04M 15/08* (2013.01); *H04M 15/10* (2013.01)

(58) Field of Classification Search
CPC ......... H04M 3/42374; H04M 3/42195; H04M 15/00

USPC ........ 379/210.01, 352, 93.17, 201.01, 88.17, 379/215.01, 350, 211.1
See application file for complete search history.

(56) References Cited

U.S. PATENT DOCUMENTS 4,947,421 A * 8/1990 Toy .................... H04M 3/48
                                                    379/215.01
2010/0296640 A1* 11/2010 Stucker ............. H04M 3/42374
                                                    379/93.17

* cited by examiner

*Primary Examiner* — Thjuan K Addy
(74) *Attorney, Agent, or Firm* — Mark M. Friedman

(57) ABSTRACT

A method is presented that allows for coordination between parties wanting to communicate. The method serves to replace the current 'synchronous' method of phone session initiation (which allows random people to interrupt one's flow) with a system that allows both parties to indicate when they are ready and willing to communicate with particular parties. Instead of a first party directly calling a second party, both indicate readiness to talk to each other by means of (for instance) status indicators on a smartphone, thereby eliminating the obtrusive nature of the time-limited phone ring. The method also includes an apparatus that determines which is the optimal party to actually place the call such that overall expenses may be minimized.

2 Claims, 12 Drawing Sheets

|    | A1 | A2 | A3 | B1 | B2 | B3 |
|----|----|----|----|----|----|-----|
| A1 | CCO No-reverse | CCO No-reverse | CCO No-reverse | Ext CCI CallBack | Ext CCI CallBack | Ext CCI CallBack |
| A2 | CCO-CCI reverse | CCO No-reverse | CCO No-reverse | Ext CCI CallBack | Ext CCI CallBack | Ext CCI CallBack |
| A3 | CCO No-reverse | CCO No-reverse | CCO No-reverse | Ext CCI CallBack | Ext CCI CallBack | Ext CCI CallBack |
| B1 | Call out No-reverse | Call out No-reverse | Call out No-reverse | CCI no-reverse | CCI no-reverse | CCI no-reverse |
| B2 | CCI-CCO Reverse | Call out No-reverse | Call out No-reverse | CCI Reverse | CCI no-reverse | CCI no-reverse |
| B3 | Call out No-reverse | Call out No-reverse | Call out No-reverse | CCI no-reverse | CCI no-reverse | CCI no-reverse |

CCO-CCI combination table

Fig. 7

TELEPHONE SESSION INITIATION SYSTEM

This application claims priority from U.S. Appl. No. 61/832,222, filed Jun. 7, 2013, entitled "Novel Telephone Initiation System", the entirety of which is expressly incorporated herein by reference.

FIELD OF THE INVENTION

The present invention relates to the field of telephony primarily, but may also include video, instant messaging and the like. The invention especially concerns means and methods for initiating calls, in a manner not related to the SIP or session initiation protocol of VOIP.

BACKGROUND OF THE INVENTION

Lowering Telephone Fees

Modern telephone plans (cellular or landline) vary widely in terms of their fee structures, which charge for voice, data, and SMS use according to various schemes. Some plans allow unlimited voice usage, or charge a flat rate for all voice calls, or charge for voice calls only after a certain number of minutes are used in a given month, and/or charge according to which provider is being called (sometimes with discounts for calls within the same carrier). Similarly, data plans can be unlimited, or charged at a flat rate, or charged only after a certain amount of data has been transferred within a certain time frame. Similar billing plans are common for SMS usage. Some telephone service providers may also levy per-minute charges on incoming calls and/or outgoing calls, and still other forms of billing are known.

There is thus much value in devising a system and method to enable automated optimization of call placement that can utilize information about billing plans to lower costs to users.

The Problem with Standard Phone Session Initiation

When a caller calls a receiving party, the caller, it may be averred, is in effect expressing a desire to speak to the receiving party for the period of time during which the recipient's phone rings. In that limited period of time the receiver is obliged to make a decision (provided the receiver is aware of the phone ring) with the following choices: to answer; to abort the call by hanging up after raising the line; for the case of mobile phones, actively rejecting the call; to ignore the call by allowing the rings to continue until they stop (when either caller hangs up or the call gets timed out by the telephony system, ignoring may be accompanied by muting the ringer); or to turn off or unplug the phone altogether. This process is pressured by time-limit since the receiving party must respond in a limited amount of time (if he is to answer). The process is also in a sense synchronous since the receiving party must respond during and within the time of the phone's ringing.

This reality of time-limited synchronous call initiation holds no matter whether the receiving party sets his phone to mute, ringtone, vibrate, a single "beep" or the like. Moreover, during a call initiation event, both parties' telephones are temporarily dedicated to the call event, meaning they cannot at this time call other recipients or receive other calls. If the receiving party hangs up, the caller gets an indication that the receiver is there and has decided to hang up on the caller. If the receiving party does not answer, it still indicates certain information. For instance if the receiving party is connected through cellular telephony, the caller may conclude that the receiving line is operating and in communication with the telephony system; is necessarily within range of a cell tower; and that the receiver is not currently talking (in another conversation). If the phone rings with a call-waiting signal then of course the caller knows that the receiver is in a conversation already. If the caller calls several times, a timeline can be constructed of the receiver's actions, comprising the times at which the receiving party is in active conversations and for what durations, times during which the line is active and inactive, and the like. The readiness with which this information may be gleaned by any third parties deprives the receiver of a crucial measure of privacy which may also be a social hazard. For instance, a party making several consecutive calls to another party, receiving for instance call waiting, and then cut off after several rings, will conclude that he is being screened by the receiving party.

Another stark disadvantage of the prevailing method of communications is the necessity on the part of the receiver—no matter how busy or preoccupied he may be—to respond in real time to incoming phone rings, regardless of the type of ring the receiver defines in his machine—be it a continuous ring, vibration, or even a single beep sound. The essence of current telecommunication is that there is a synchronous event we may call a "phone ring" with an associated time-out.

There is thus a further long felt need for systems and methods to allow for telephonic connection without the stress and attention demanded by conventional 'synchronous' connection procedures and the lack of privacy of current telephony systems.

SUMMARY OF THE INVENTION

Caller-Callee Optimization (CCO)

Consider any given set of two (or, in some cases, more than two) phone users that wish to talk to each other as an economic unit. This unit has an interest in lowering overall payments to outside parties (in this case, their telephone service providers). The phone users as a unit stand to gain from coordinating their phone calls, to take better advantage of the two plans. For instance, if Alice (who has a per-minute voice call plan) calls Bob (who has an unlimited voice call plan), Alice gets charged per minute. But had the call been initiated by Bob, no charge would have been levied. It would be advantageous for both, when viewed as a single economic unit, that Bob places all calls, regardless of which of the two was the Initiator of the phone session. The invention comes to allow for this coordination to occur seamlessly.

We define a "Phone Session" as an event wherein two (or more) parties implement a voice connection (or any other form of simultaneous electronic connection, be it over PSTN, VoIP, text, or other modality or communications means) for any period of time. The Phone Session is originally initiated by one of the parties, referred to hereinafter as the "Original Session Initiator" (OSI). While we commonly identify the Original Session Initiator as the party which actually places the phone call (and hence usually pays any fees which may apply), this need not necessarily be the case. Thus, we define the "Actual Call Initiator" (ACI) as the party which actually places the call (and may be subject to whichever charges that may apply). In any given case, the two may or may not be the same person.

This distinction, while not commonly recognized, already exists in practice. Consider, for instance, the aforementioned paying-per-minute John and his unlimited-calls-plan friend Joe, and presume that John and Joe are both aware of each others' phone plans, as well as, of course, their own. When John wishes to talk with Joe (i.e. John is the Original Session Initiator), he may try to improvise a way to cause Joe to actually place the call (making Joe the Actual Call Initiator). John may ring Joe, promptly hang up, hoping that Joe will "get the message" and call him back; John may send Joe a short SMS asking Joe to call him; or rather, John may call, and when Joe answers, John may explicitly ask him to call him back in order to save money during the rest of the conversation. Regardless of the nature of their actual relationship or practice, we know that assuring that Joe is always the Actual Call Initiator is advantageous for John, while Joe, for his part, is indifferent to it from the financial point of view (since he pays the same no matter how many calls are made). Providing there is goodwill between them, there is a clear interest in assuring the ACI is the more economical party. Furthermore, the money saved by such actions may be shared according to some predetermined plan, to benefit both sides. However the aforementioned methods for assuring this are sporadic, awkward and inefficient. Moreover, the money saved might be split in some fashion between parties to better induce Joe to cooperate.

The invention comprises methods for ensuring that phone sessions between two (or more) parties are optimized so that the party that actually places the call is chosen intelligently, in order to save money (for example).

Each user of the system inputs information concerning their plan(s) into a central database. When a user of the system wants to start a conversation with another user of the system, a coordination step is undertaken first, before the call is actually placed. Depending on the details of the users' plans and their stated preferences, calls initiated by either party may be placed by one or the other party to lower overall costs (for example).

Coordinated Call Initiation (CCD

A method for initiating telephone conversations is provided wherein the calling party issues a 'Call Request' to the receiving party instead of dialing directly. The receiving party has no time limit for his response. As long as the receiving party does not respond, the calling party has no information about the receiving party's status (which is denoted by the color white for this case). At his leisure, the receiving party can respond to the request by entering one of two further states; "yellow" status, meaning he acknowledges the request and is possibly willing to take the call in the future, or "green" status meaning he is willing to take the call currently. Concurrently, the calling party may change status at any time, from green to yellow and vice-versa. When both parties turn green, the earlier party to turn green is requested to verify his continued readiness within a certain time-limit, and if he does so a standard telephony connection is implemented. In conjunction with the CCO described above, the call is initiated either using POTS (Plain old Telephone System), VOIP (Voice-over Internet Protocol), or other systems, by the ACI chosen intelligently according to the CCO process thus utilizing both elements (CCO and CCI) in one system.

The aforementioned embodiments of the invention are described and illustrated in conjunction with systems and methods thereof, which are meant to be merely illustrative and not limiting. Furthermore just as every particular reference may embody particular methods/systems, yet not require such, ultimately such teaching is meant for all expressions notwithstanding the use of particular embodiments.

BRIEF DESCRIPTION OF THE DRAWINGS

Embodiments and features of the present invention are described herein in conjunction with the following drawings.

In the figures and/or description herein, the following reference numerals have been utilized throughout the figures:

FIG. 7 illustrates a matrix of possible relations for a pair of conversants of two types: purely CCO users and CCI users.

Figure 1:
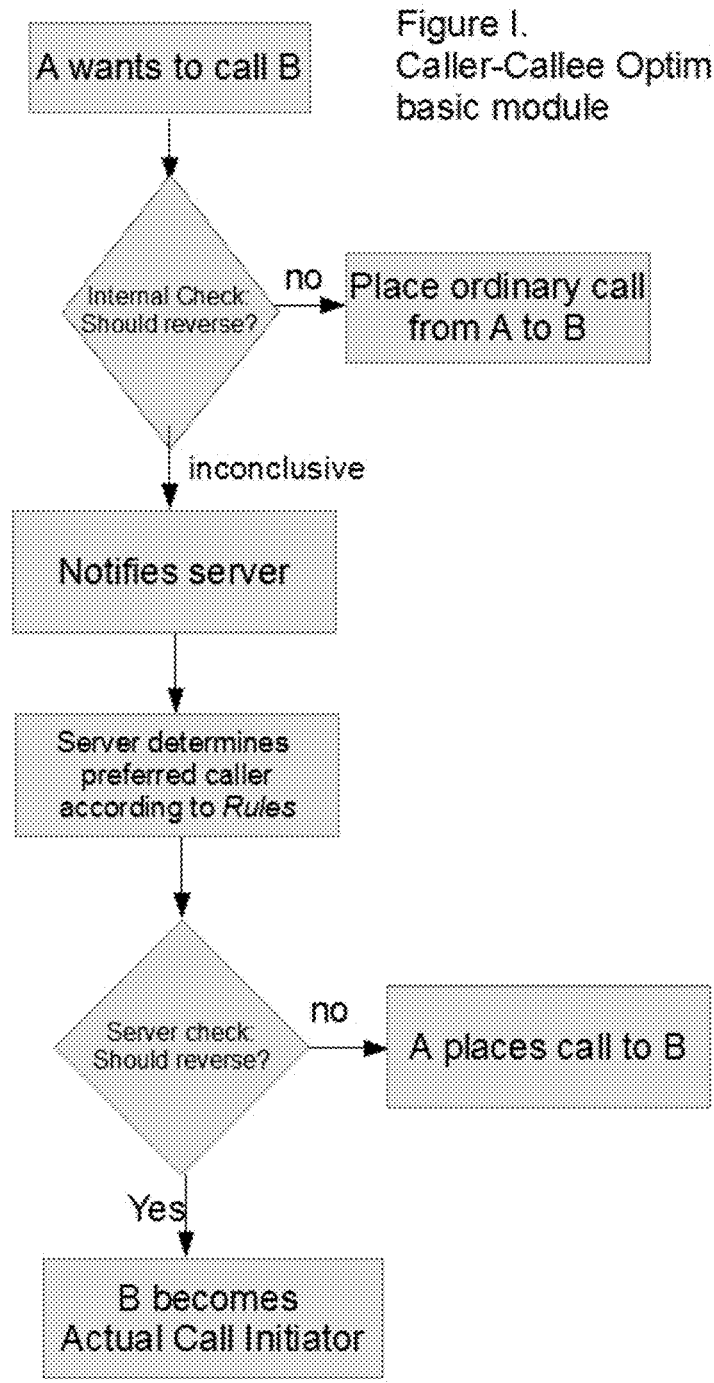
FIG. 1 shows a flowchart of one possible implementation of the CCO invention.
Figure 2:
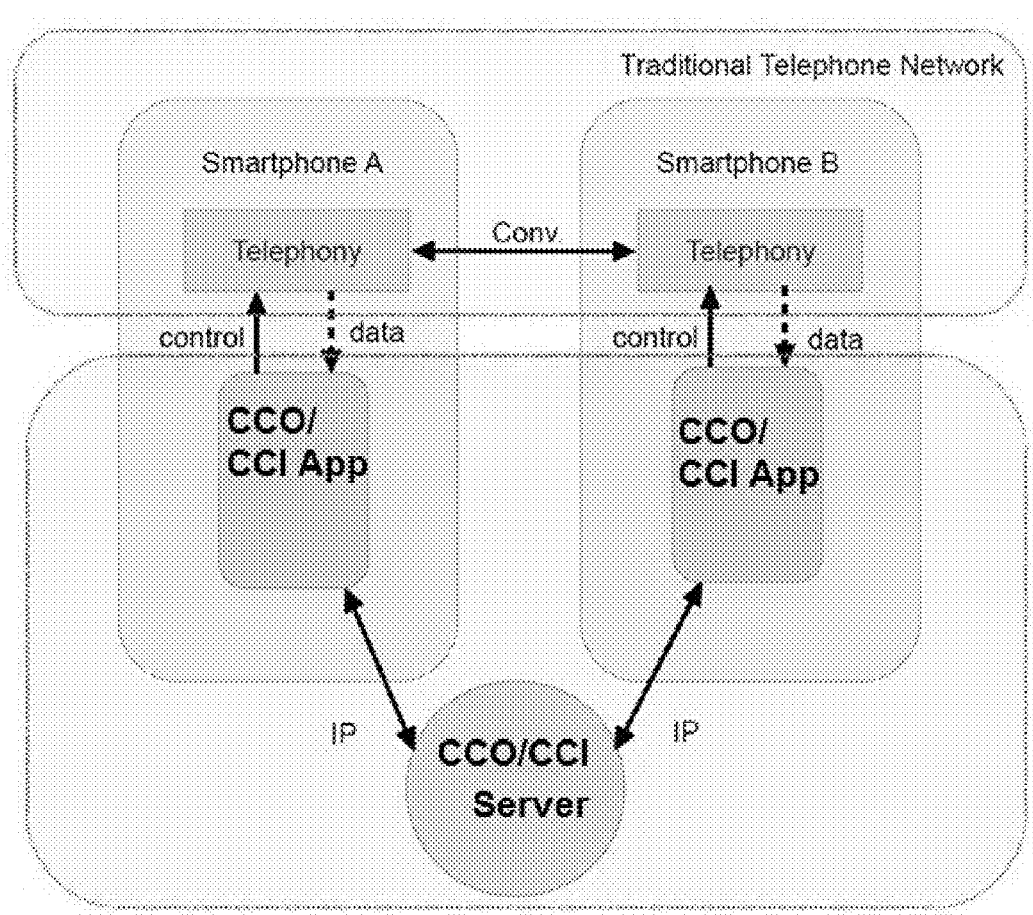
FIG. 2 is a block diagram consistent with one embodiment of the invention involving both CCO and CCI. It shows one possible system diagram for implementation of the system using an application layer over traditional telephony. Here the smartphones A on the left and B on the right are each running software of the invention (the 'CCO/CCI App'). This application handles the protocol described above of sending call requests and initiating actual telephony only when both parties are in the appropriate state, and/or according to Caller-Callee Optimization.

It should be understood that the drawings are not necessarily drawn to scale and are only schematic representations of possible embodiments.

DETAILED DESCRIPTION OF PREFERRED EMBODIMENTS

The present invention will be understood from the following detailed description of preferred embodiments, which are meant to be descriptive and not limiting. For the sake of brevity, some well-known features, methods, systems, procedures, components, circuits, and so on, are not described in detail.

The term 'Caller-Callee Optimization (CCO)' refers hereinafter to a novel system enabling use of the preferred actual caller regardless of the identity of the Original Session Initiator.

The term 'Coordinated Call Initiation (CCI)' refers hereinafter to a novel protocol for coordinating the initiation of voice (and other types of) sessions, and may optionally encompass the CCO module.

The term 'voice conversation' (or 'phone session' interchangeably) hereinafter refers to any information transfer, including for instance transmission of audio signals, video signals, VOIP, conference calls, multiparty calls, messaging, and the like.

The term 'Call Request' refers hereinafter to the first stage in the initiation of a voice (or other form of) session within the CCI module.

The term 'Call Initiation Attempt (CIA)' is the final stage of the Call Request procedure within the CCI system. It starts when both sides in a Call Request become Green (=ready to talk) at the same time. If successful, the CIA leads to the implementation of an actual call session.

The term 'Original Session Initiator (OSI)' (aka 'Call Request Initiator' or 'Inviter') refers hereinafter to the party that first shows the desire to initiate a phone conversation. In CCI, the OSI is the initiator of the Call Request, hence he is invites other party to hold a voice session.

The term 'Original Session Recipient' (aka 'Call Request Recipient' or 'Invitee') refers hereinafter to the party the original session initiator is trying to call.

The term 'CIA Initiator' refers hereinafter to the party that initiates a CIA by changing his status within a given Call Request to Green, while the other party is already Green.

The term 'CIA Confirmer' refers hereinafter, within a CIA event, to the party that is requested to confirm his readiness to enter a voice session, before such actually begins. His status within a given Call Request was Green when the other party (the CIA initiator) also became Green.

The term 'Actual Caller' or 'Actual Call Initiator (ACI)' refers hereinafter to the party that actually places the phone call (and bares the charges that may apply).

The term 'Actual Callee' refers hereinafter to the party that actually receives a phone call.

The term 'phone session', 'phone call', and 'voice session' all refer interchangeably hereinafter to a two—or more-way communication between remote participants.

Caller-Callee Optimization (CCO)

The invention comprises a system that will automatically ensure that whenever possible, advantageous, and agreed-upon, phone sessions will be actually placed by one particular party rather than the other, regardless of the identity of the original initiator of the session, and possibly but not necessarily dependent upon the nature of the relationship between the two (or more) parties. To this end a method for coordinated call placement is disclosed.

A useful preliminary step is that each user of the system inputs information concerning their plan(s) into a central database, or simply into a small piece of data such as a cookie residing on the phone and/or the cloud/server. Alternatively this information may be inferred, 'intelligently guessed' or otherwise derived automatically, for instance: by identification of the telephone carrier involved; by dynamically analyzing a user's usage in the current month to determine his actual cost-per-minute; by detecting the user's location in order to determine actual cost; by analyzing statistics concerning the more common plans of each company, and the like.

As will already have been discerned by the perspicacious reader, the inventive system, when given access to the aforementioned plan information of both participants in a potential conversation, can now determine the cheaper route; this may be that participant A call participant B, or vice versa; and the cheapest way to implement the call may be over a voice line, or using VOIP, which in turn may be over a GSM or other wireless network, over via a local wifi or cable connection, or otherwise.

When a user of the system wants to start a conversation with another user of the system, a coordination step is undertaken first, before the call is actually placed. Details of the two conversants' plans are determined as described above, and considered. One particularly simple way to specify a user's preferences is in terms of when they are willing to have a call 'reversed' (i.e. to call a second party when the second party wants to initiate a phone session, or in other words to be the Actual Call Initiator even when he/she is not the Original Session Initiator).

In one embodiment, users may belong to a group, characterized by one of three possibilities:
1. The user is willing to be the Actual Call Initiator even when not the Original Session Initiator. (For example if the user has a fixed price plan).
2. The user desires not to be the Actual Call Initiator even when he is the Original Session Initiator. (For example if the user has a per-minute plan he will prefer that the other party call him).
3. The user is not willing to have a call reversed, ever.

The system may implement calling rules based on these preferences. For example, only if a user in group 2 calls a user in group 1 will the call be reversed.

Other embodiments may be envisioned. For example the system may allow for call reversal only from or to specific contacts, and/or only after the user's monthly use has exceeded a given number of minutes, and/or to allow incoming reversals only if the cost to the user is lower than a certain threshold, and/or to request call reversals only if the cost to the user is higher than a certain threshold, and the like.

Furthermore details of both plans may be taken into account. Thus the user may choose for example to minimize total cost, based on the total costs calculated for the two users for the given call under consideration. If considering both users' cost, one of the following will generally be true:
1. The total cost (including cost to both users) is less if the original user who desired the call (the 'Original Call Initiator'), places the call;
2. The total cost (including cost to both users) is less if the destination user (to whom the original user wanted to place the call) places the call;
3. The total cost is equal in both cases.

These broad classes can be further subdivided. For instance, the cost to a given user may be greater in a given case even though the overall cost (including cost to both users) decreases.

For all of these cases, the invention allows users to define how they want to allow for call coordination, in some embodiments by defining a set of rules to deal with various cases that may arise. For example it is within provision of the invention to allow a user to choose between "minimize overall cost", "minimize cost to me", "minimize cost to user X" and similar options.

Furthermore it is within provision of the invention to allow for 'savings sharing' whereby if a given user A saves a certain amount by having user B call him (instead of A calling B), then A gives some fraction of the amount saved to B, and possibly some fraction is awarded to the system operator. Generally if the users collectively save a given amount by using the system, a certain fraction of the savings may be given to the user with the cheaper plan by the user with the more expensive plan.

It is within provision of the invention to use preferences to determine who calls whom. For instance, a user can opt for calling by means of whatever route is cheaper for him personally, or for whatever route is cheaper overall. Furthermore the user can opt for use of a 'savings-sharing' model whereby some fraction of whatever monies are saved, are distributed to both users in some fashion determine by preference or system operator.

An internal check is first carried out as to whether the call should be reversed. This is a check as to whether A has free or fixed rate outgoing calls.

In the coordination step, details of the two conversants' plans are considered, or first determined and considered (if they have not been determined beforehand). A set of preferences will also have been determined (most usefully aforehand) and now considered. Based on the determined costs determined to the two users for the given call under consideration, it will be found either that:
1. The total cost (including cost to both users) is less if the original user who desired the call, places the call;
2. The total cost (including cost to both users) is less if the destination user (to whom the original user wanted to place the call) places the call;
3. The total cost is equal in both cases.

These broad classes can be further subdivided. For instance, the cost to a given user may be greater in a given case even though the overall cost (including cost to both users) decreases.

For all of these cases, the invention allows users to define how they want to allow for call coordination. For example it is within provision of the invention to allow a user to choose between "minimize overall cost" and "minimize cost to me" options. Furthermore it is within provision of the invention to allow for 'savings sharing' whereby if a given user A saves a certain amount by having user B call him (instead of A calling B), then some fraction of the amount saved is given to B, and possibly some fraction is awarded to the system operator.

FIG. 1 shows one possible flowchart for implementation of the system.

First, an internal check is done to see whether the caller A has a fixed price or free plan such that he can make calls without incurring extra cost. If this is the case, A need not request a reverse. Thus A may predefine that he places an ordinary call to B in this case. For such purposes a set of predefined settings may be stored locally and/or on the server for each user.

If A does not have a free or fixed cost plan, then this check is inconclusive and the server is notified that A wants to contact B. The server determines which participant should call which. If the server determines that the call should be reversed, then a call is made from B to A. Otherwise, a call is made from A to B.

Figure 3:
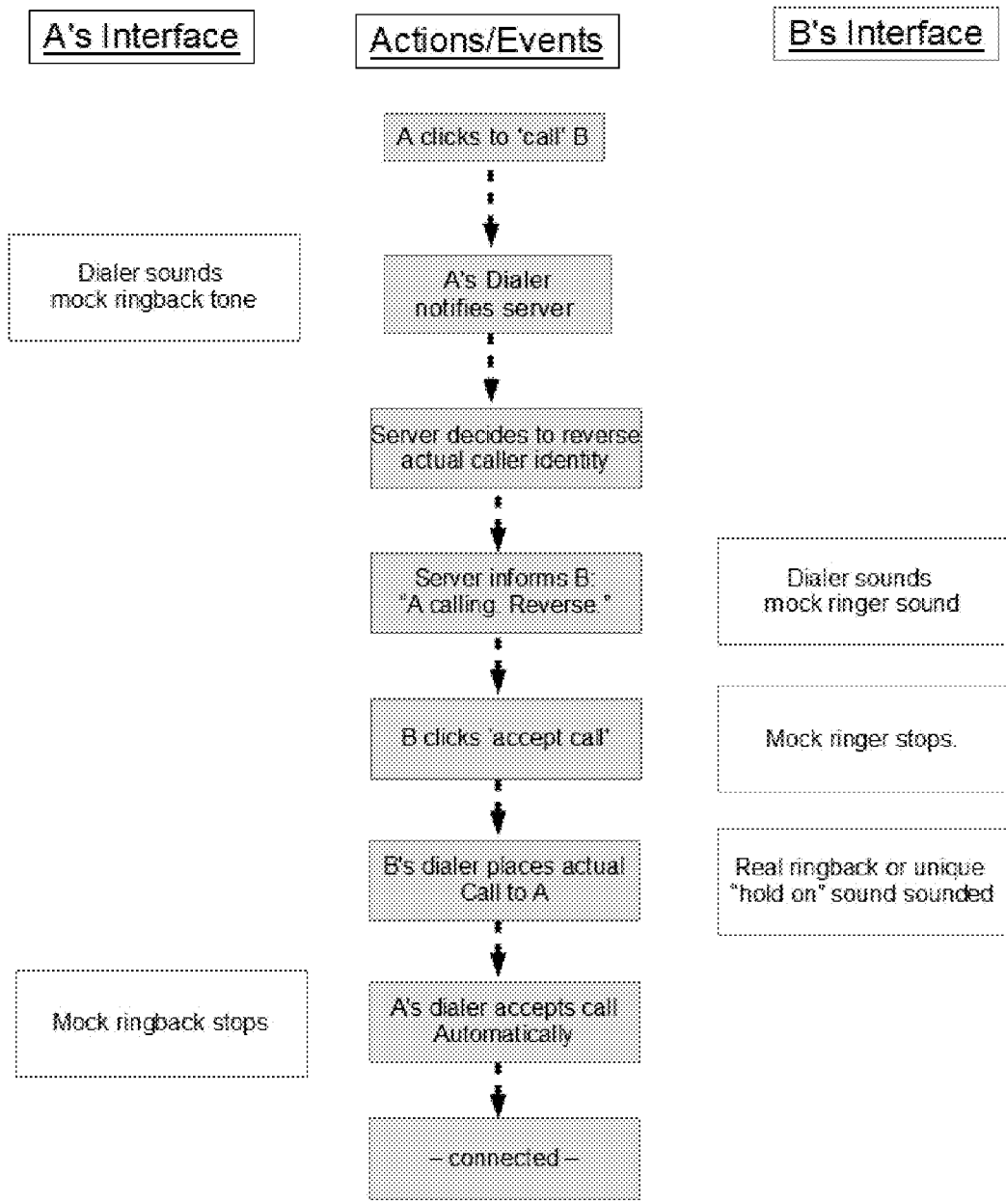
FIG. 3 is a flowchart showing one possible scenario of the CCO, describing the logical flow of a Call Request, along with its user interface on both sides.

FIG. 3 shows a flowchart of events occurring for two CCO users in the case that A initiates contact with B. On the left one sees the output to A's interface, and on the right one sees the output to B's interface, while in the middle the events occurring are listed.

The first event (middle column) is that A clicks on his GUI to contact B. A's dialler (an app of the invention running on A's phone) will sound a mock ringback tone as though A were actually calling B. In the meantime the dialler notifies the server that A wants to contact B.

If the call is reversed, the application may take some additional steps to make the process appear more like a regular phone call, when in essence the call has actually been reversed. B in the case of a reversal will receive a mock ring. When B answers this mock call, his phone places an actual call to A, and B hears the real ringback produced by the telephony system, or alternatively a designated 'hold' sound or message produced locally. As long as A's phone is still operational, B will hear the actual ringback (or dial tone) of A's phone. A's dialler will accept the call automatically, and both A's and B's mock ringback tones will stop.

As mentioned, the savings accrued by use of the invention may optionally be divided between participants (with some fraction possibly going to the operator of the inventive system).

It is within provision of the invention that the network over which a call is placed be chosen intelligently, again according to information concerning plan costs, in addition to current network availability. For example, if both users have indicated willingness to use VOIP for calls in addition to standard cellular network telephony, it may prove cheaper to simply call using VOIP by means of free or cheap network connectivity. This may be the case if both users are in the vicinity of free wifi networks, for instance. On the other hand, if data connectivity is expensive or unavailable, it may prove cheaper to connect over the standard cellular network, originating the call from the user that will be less expensive.

The aforementioned intelligent choice of network may be extended to messaging systems, for example using a unified messaging system that can be implemented over a plurality of systems such as SMS and 3G data; messages will be passed over that system which is determined to be the least expensive option, again as determined according to user preferences; either cheapest overall, or cheapest to the originating or receiving caller, and either sharing savings or not.

Coordinated Call Initiation (CCI)

It is further within provision of the invention to allow for a novel method for initiating telephone conversations wherein the calling party issues a 'Call Request' to the receiving party instead of dialing directly. We refer to this system as Coordinated Call Initiation (CCI). Within this novel system, one can include the functionality of the aforementioned Caller-Callee Optimization (CCO). The point of the system is to perform a type of two-way screening such that calls are initiated only when both parties are ready and willing to speak.

The invention comprises systems and methods for asynchronously initiating synchronous voice calls. Current voice communication systems are initiated synchronously in the sense that the receiving party must answer in real time upon receiving a call. In contrast the inventive system offers an asynchronous stage of conversation request (initiation), leading up to the call initiation, after which the communication becomes synchronous.

The invention comprises a system that reinvents the core protocol for initiation of a voice conversation between two or more parties by eliminating the concept of the phone ring as a starting action and state. The phone ring, as traditionally used, implements a situation where one party—the Caller—attempts to contact the receiving party in a situation of 'asymmetric knowledge' in the sense that the Caller knows he himself is able to talk, but does not know initially if the Receiver is free. For the period of time during which the phone rings, the caller is expressing a desire to speak to the receiver, and in that limited period of time the Receiver is notified of the caller's intent (by phone ring, vibration, or other notification). During this period the Receiver is required to make a decision within the limited period of the call initiation event, generally between the following choices: to answer; to refuse the call by raising the line and hanging up (landlines) or rejecting the call (mobiles); to sit out the rings in silence; or in some cases to deny the call while sending an SMS response chosen from a menu of 'canned' responses (an option sometimes given on certain smartphones). Each of these choices has consequences in terms of what actually happens (a conversation is initiated or not), and in terms of the information the caller obtains regarding the situation of the receiver and his attitude toward the caller, while this may not be in the best interests of the receiver.

The inventive method instead defines a new protocol by which voice conversations are initiated, or more accurately, negotiated between two or more parties. Rather than the caller having free access to call the receiver at will and thereby creating an incoming call initiation event (i.e. a phone ring) on the receiver's side, in the inventive system, the caller may only place a Call Request.

The Call Request notifies the receiver of the intent of the caller to talk in the near future. Until the receiver decides to actively respond affirmatively to the Call Request, no indication of the Receiver's status (whether his phone is on or off; whether his line is free or is in another call, etc.) is available to the caller. Only if and when the Call Request is accepted by the receiving party, and the receiving party voluntarily confirms knowledge of it, will the Caller receive any indication of the receiver's situation. This is a feature of privacy. The system, then, enables both parties to dynamically find the earliest occasion where both are free and willing to commence with this particular voice conversation, and only then the system initiates a voice session. This is a feature of dynamic scheduling.

Coordinated Call Initiation allows phone users to avoid the interruption and need for immediate response to incoming calls as in the standard dialling system, by use of 'Call Requests' instead of direct calls. A person wishing to start a call issues a Call Request to the receiving party, instead of dialling directly. The receiving party can then either ignore (unknown status' or White) or respond to the request by choosing to be in one of two further states; 'on hold' (Yellow) but possibly willing to take the call in the future, or 'ready to talk now' (Green). If the receiving party subsequently indicates they are in a position to accept the Call Request, and the calling party verifies his continued readiness, a standard telephony connection is implemented, either using POTS (Plain old Telephone System), VOIP (Voice-over Internet Protocol), or other systems. The decision as to which participant will become the Actual Call Initiator, may be determined as described above (in the CCO module) based on a set of rules and the details of the user's respective plans. The various user states (ready to talk', 'on hold' and 'unknown') are represented in certain embodiments by icons representing users having colors representing user states (e.g. green, yellow, and white, respectively).

The inventive system offers an asynchronous stage of conversation request (initiation), leading up to the call session itself, which is by nature synchronous.

Once a Call Request is opened, each potential conversation participant is allocated a status (which is particular to that Call Request). On the invitor's side (the Original Session Initiator) the status can receive the following values, represented by colors (given here by way of example):

Green: interested and currently available to talk.

Yellow: interested to talk but temporarily unavailable.

Unlike the Invitee, which by default gets the status of White (unknown'), the Invitor may never choose the status of White (since the Invitor's status should never be 'unkown').

Until the invitee responds by choosing the values of 'Green' or 'Yellow', his status by default takes the value of 'White', which, in essence, expresses that no information is known about his status (i.e. his device is off or not in reception, is not aware of the Call Request, has not received the Call Request, or has not yet chosen to confirm knowledge of it).

Accordingly, once a Call Request has been made, the Invitor's status is by default set to Green, and the Invitee's status is by default set to White. At any time (abiding by the asynchronous nature of the inventive protocol), any party may switch his status freely from any state to either Yellow or Green. Once the invited party switches from White to either Yellow or Green, he may not switch back to White.

Any party may choose to cancel a Call Request. Yet there is a difference depending on which party does so. When the Invitor cancels a Call Request (which may be represented for example by a 'Red' status) the Invitee necessarily receives notification of this cancellation. This need be the system rule, since it must assure that the Invitor would not trouble other parties to consider Call Request that he himself has chosen to disregard.

On the other hand, when the Invitee cancels a Call Request, there are more possibilities. In one embodiment, the Invitee's cancellation depends on his status at the time. If his status was 'White' when canceling, the Invitor receives no indication of the cancellation (thus protecting Invitee's discretion). If the Invitee was Green at the time, the Invitor will not receive notification of the Invitee's cancellation but the later's status would be automatically changed to Yellow (since causing the Invitor to continue regarding Invitee as 'currently available' is a disturbance to the flow of the invented protocol).

In yet another embodiment, the Invitee would have the choice, when cancelling, to inform Invitor of his cancellation, thus declaring that he is not capable or interested to take on his invitation to talk at this time. This status, in one embodiment, may be marked 'Red'.

Each party is always informed as to the other party's status regarding that particular Call Request. Of course, a party may choose one status for one Call Request, while choosing a different status for another Call Request. A user may change his status within all open Call Requests to, say, Green or Yellow, with one single action. Or, in cases such as when entering a meeting, he may choose to switch to Yellow only those Call Requests in which he is currently defined as Green (excluding those where he is defined as White) with one single action.

In the event that both parties in a Call Request are simultaneously 'Green', the system immediately starts a Call Initiation Attempt (CIA. FIG. 4-416, 5-502). In this event, the system notifies both parties of the attempt, yet with a difference: the party that was 'Green' first (within that particular sequence of status changes on either party), is requested to confirm his availability for a voice session at that moment. At the same time, the other party (i.e. the party that was the later to switch to 'Green' within that sequence) is simply notified that the system is currently requesting the other party's confirmation in an attempt to promptly start a voice session. Unlike the former stage of the CCI process, this Call Initiation Attempt stage is limited by a time-limit (the default being, by way of example, say 15 seconds).

Figure 4:
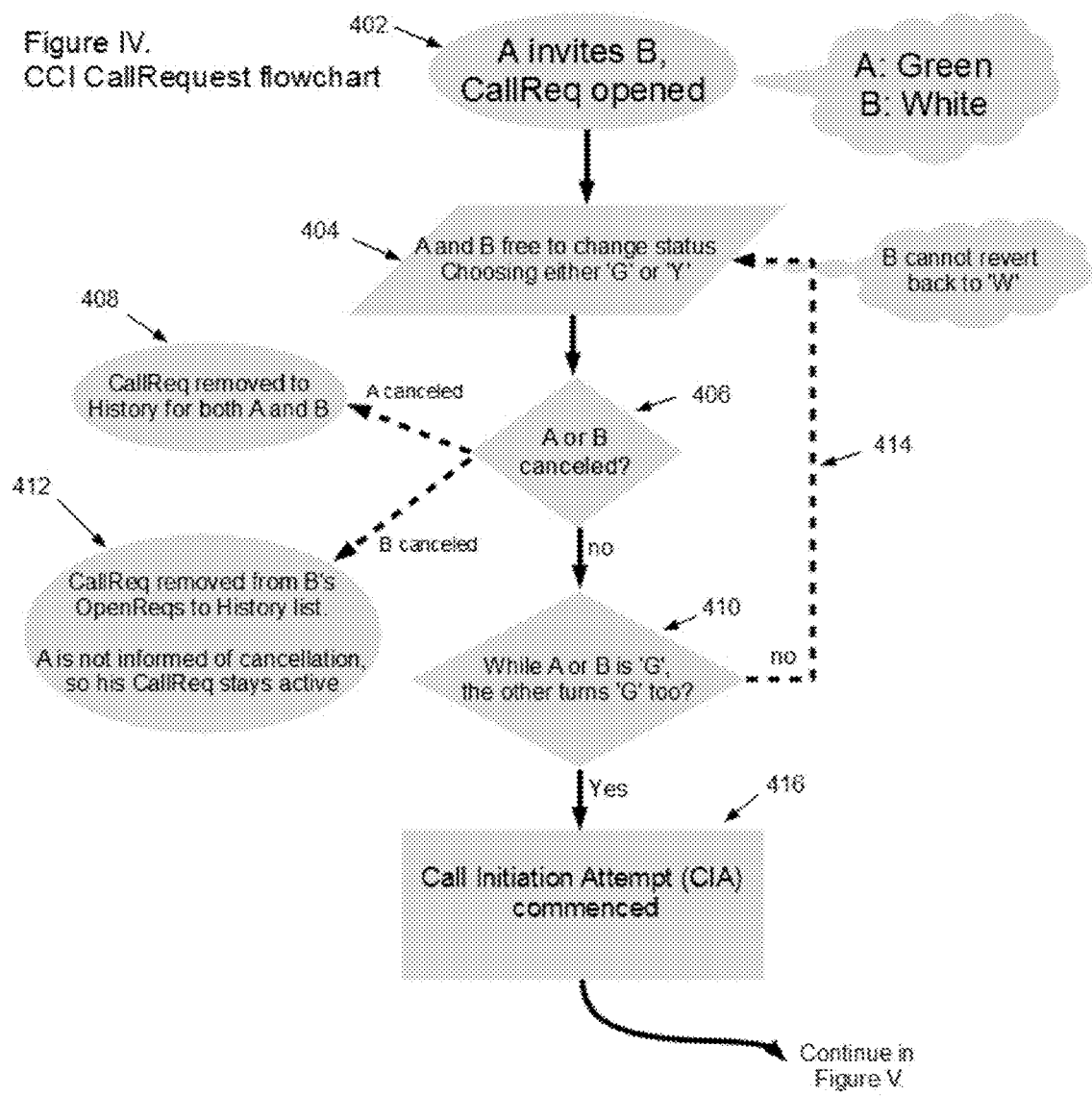
FIG. 4 illustrates a flowchart of the preliminary stage of the CCI invention, the Call Request process.
Figure 5:
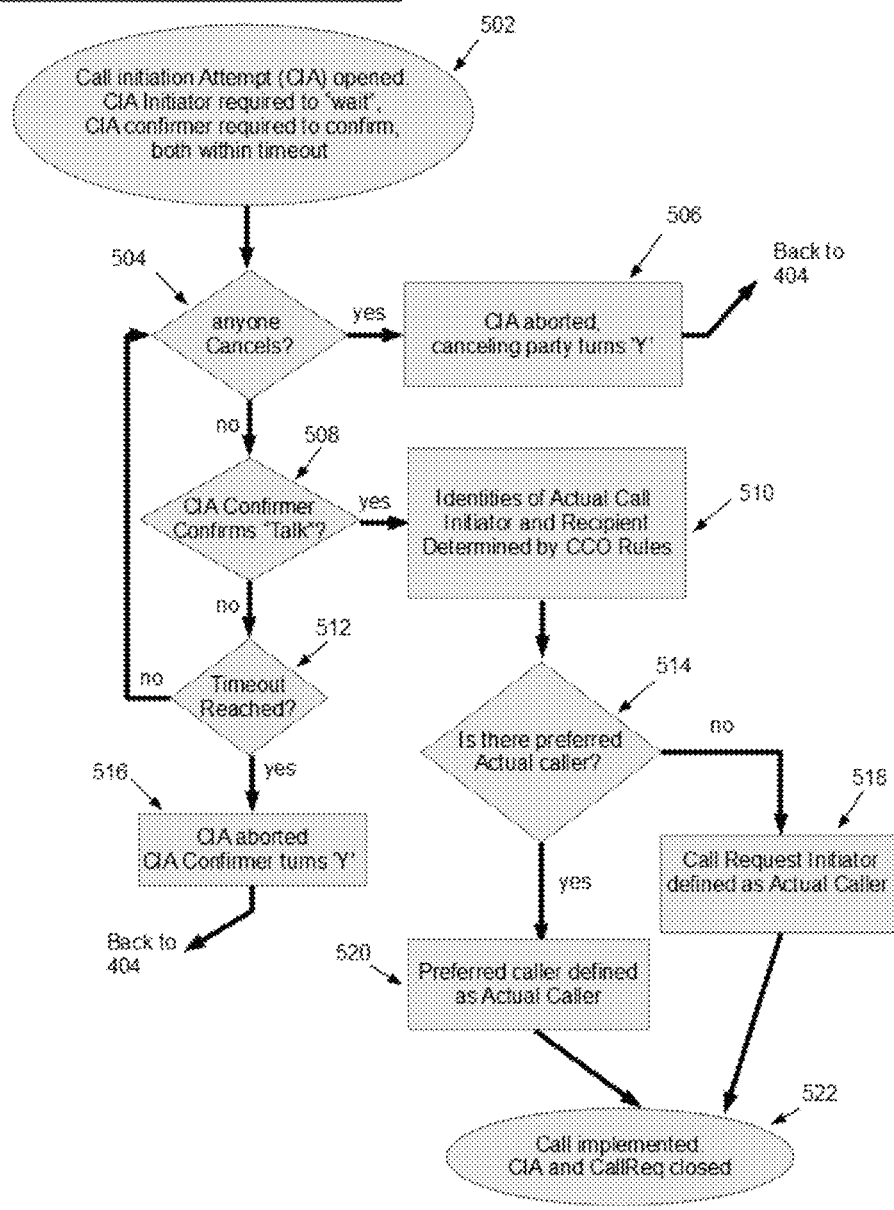
FIG. 5 illustrates a flowchart of the Call Initiation Attempt (CIA), which is the culmination of the Call Request process illustrated in FIG. 4.

FIG. 4 presents a flowchart for operation of an embodiment consistent with the CCI aspect of the invention, and FIG. 5 includes elements from the CCO aspect of the invention. The flow starts with A inviting B, which causes a Call Request to be opened with B (402). A is at this point green and B is white. A and B are both now free to change their status, and can choose either green or yellow (404), or to cancel (406). If A cancels (408), the Call Request is removed to the Call History (or Log) for both A and B. If B cancels (412), the Call Request is removed from B's list of Open Requests and added to the History. A is not informed of the cancellation, thus his Call Request remains active (to protect B's privacy).

In another embodiment of the invention, user B may also choose to allow the Inviting party (A) to receive notice of his cancellation of the Call Request.

If neither A nor B cancels (410), and both become concurrently green status at any time, a Call Initiation Attempt (CIA) is started (416). FIG. 5 details the CIA process that starts in FIG. 4 (416).

This flowchart (FIG. 5) shows the flow for the Call Initiation Attempt (CIA) which occurs in cases when both A and B are CCI users. The CIA initiator (i.e. the later party to become Green) is requested to wait. The CIA confirmer (the earlier party to have become Green) is asked to confirm his readiness to hold the voice session within a predetermined timeout period (508). If either party cancels within the timeout period (504,506), the CIA is aborted, the Call Request is returned to its basic pre-CIA state (FIG. 4), and the cancelling party's status is automatically changed to Yellow. If the CIA confirmer confirms, a call is initiated (510). The system determines whether the call should be reversed or not depending on the CCO rules, which are based on preferences and calling plans of A,B (514). If there is a preferred caller, then that caller places the actual call as described above for the CCO-CCO case (520). If there is no preferred caller, the CIA initiator places the actual call (other embodiments may define different rules, e.g. that the OSI will be the ACI and actually place the call) (518).

If the timeout is reached before the confirmer confirms, the CIA is aborted, the CIA confirmer turns to 'yellow' status, and the system returns to the state 404 of FIG. 4, in which A and B may switch freely from Green to Yellow status and vice versa, until a CIA is implemented or the Call Request cancelled.

Figure 6:
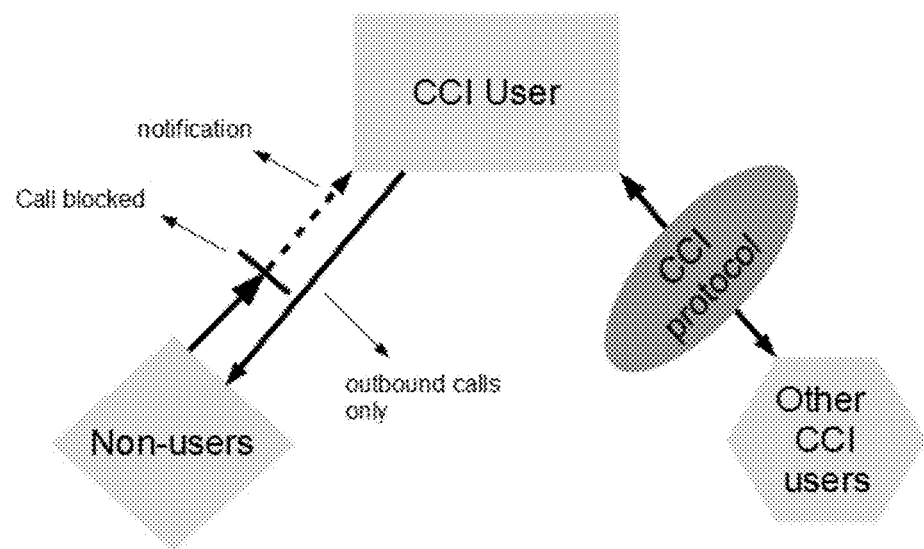
FIG. 6 illustrates a possible system diagram which demonstrates how the CCI system combines its user's communication with both other CCI users and non-users.

FIG. 6 shows how the CCI system controls communications both with other users of the system and with non-users of the system. The figure shows a system diagram in which a CCI user may possibly be contacted by both non-users and other CCI users. In the case that a non-user calls a CCI user, the incoming call is blocked and a designated "external Call Request" is issued and placed in the Call Requests list within the user's application. If the CCI user at some point chooses to respond to the external blocked Call Request (rather than indicating a green status as is the case with CCI users' Call Requests), then a traditional outgoing call is placed from the CCI user to the non-user. In the case that the caller is a CCI user, then the regular CCI protocol (as outlined in the figures above) is implemented.

Figure 9:
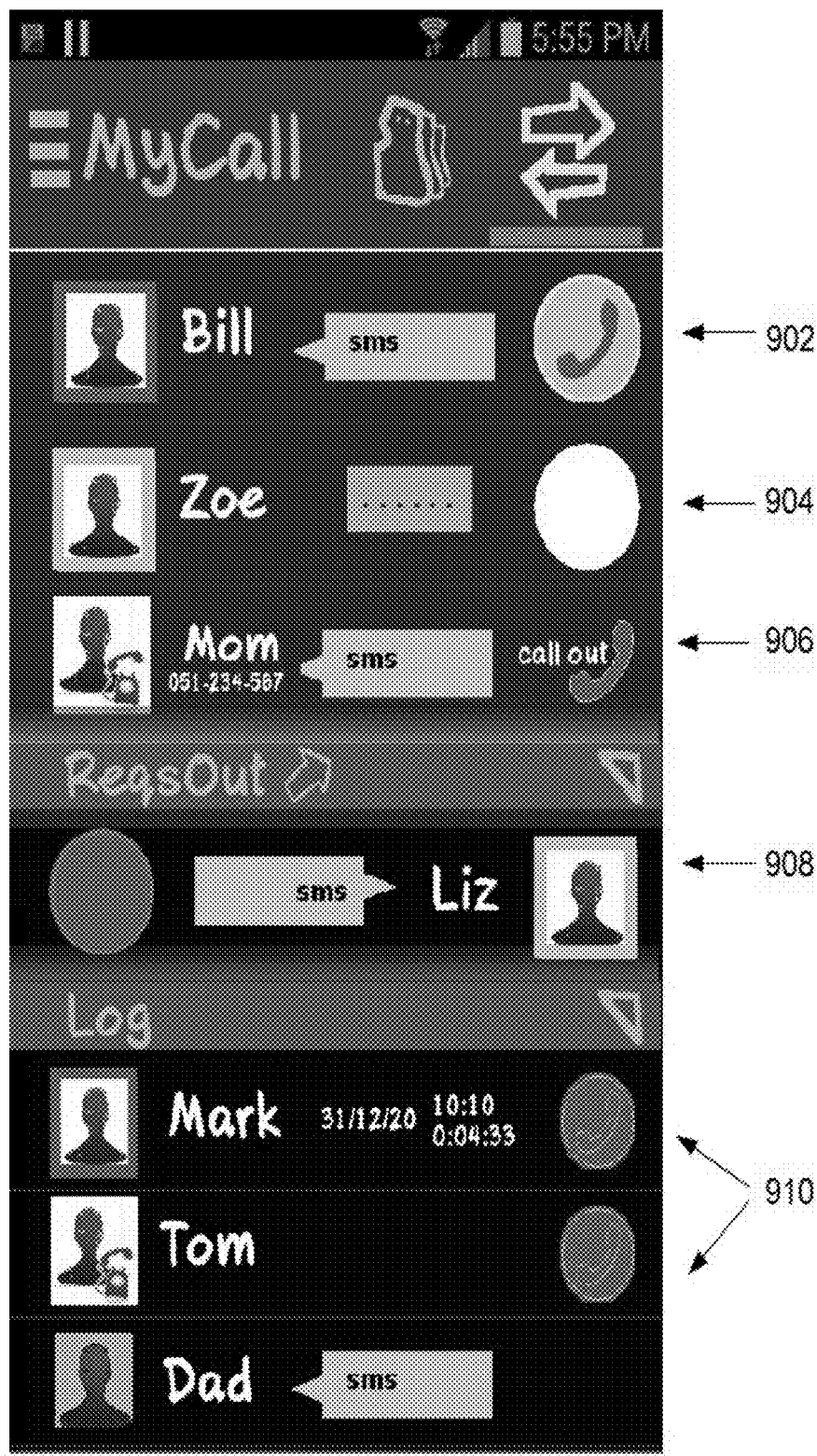
FIG. 9 illustrates a possible GUI for use with a Call Request system.

FIG. 9 shows one possible implementation of a user interface for the CCI module of the invention. In this embodiment the top part (902-908) shows the all the pending Call Requests (or Open Requests). Of this, the upper section shows the pending incoming Call Requests, including both calls from non-users of the system (906) as well as users of the system (902,904). The lower section (in this possible embodiment) shows pending outgoing Call Requests that the user has initiated and that are still open, having been neither closed nor implemented yet. In the example of the Figure, there is only one such Call Request (908). External incoming calls that have been blocked by the system (as described in FIG. 6), may be presented with a unique marking, for instance, on a gray border with a traditional telephone sign on the foreground (906). A click on the user's own icon (on the right) will produce an outgoing call to the said external caller.

The bottom section may show a history or log of finished calls, or the contacts list, or nothing (thus making the screen solely an Open Requests screen).

The left side of the open pending requests (top) is the initiator or original call initiator, and the icon on the right side represents the invitee. In both cases of incoming and outgoing requests, the other party is represented by an icon (when available) with a colored border indicating status for that particular Call Request, be it green, yellow, or white. If no icon is available a default icon may be used. On the other side, the circular icon represents the user's own status for each particular Call Request. A click on the user icon can be used to change his status.

When the user status is Yellow, and the other relevant contact is not green, then the user's icon is a simple yellow circle. But when the other side (that of the contact) is Green, the user's icon may have a green telephone sign on the Yellow background to express the fact that any click will open a CIA and attempt a call.

The user may choose to view a window (or tab) that shows only the pending Call Requests, without the Log or History below it. Users may also use a widget or additional service apps that will always show pending Call Requests on the Home screen or on the Lock Screen and sound unique and distinctive notifications for different types of events (namely, external blocked call; new Call Request; and Call Initiation Attempt) according to settings and user preferences.

While incoming and outgoing Call Requests will be ordered according to global definitions placed in a "settings" module (choosing for example either LIFO or FIFO), users may have the option to manually modify the order, for instance, by dragging a Call Request up or down. Once a Call Request has been, for example, dragged to the top of the list, user may also choose to either "freeze" said Call Request so that he will stay on top of list even after more Call Requests come in, or not.

Figure 10A:
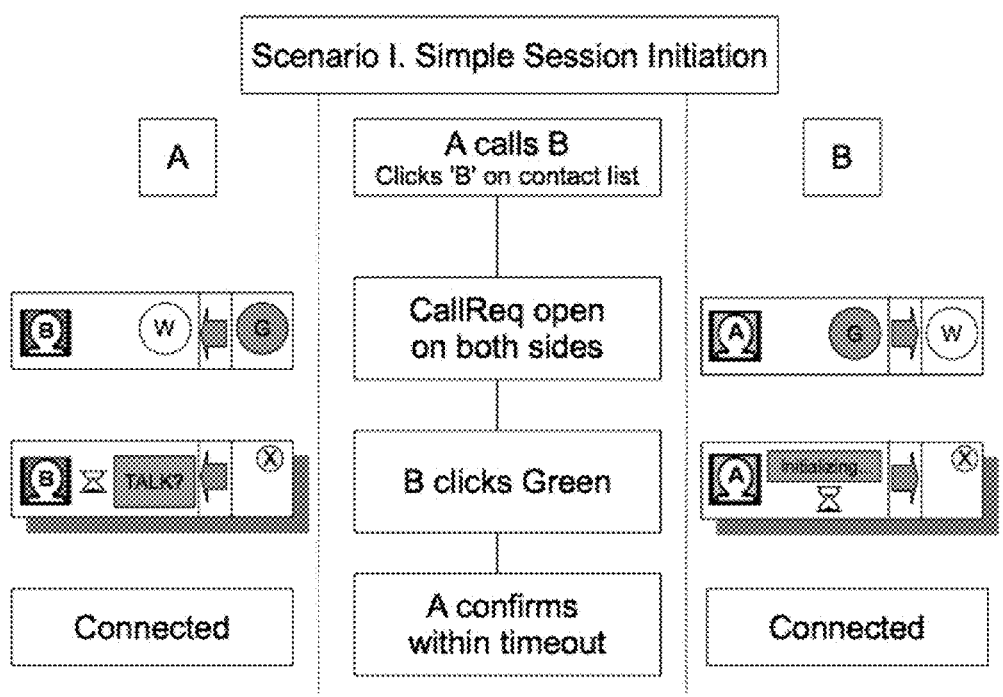
FIGS. 10A-C illustrates an example sequence of operations implementing the inventive system.
Figure 10B:
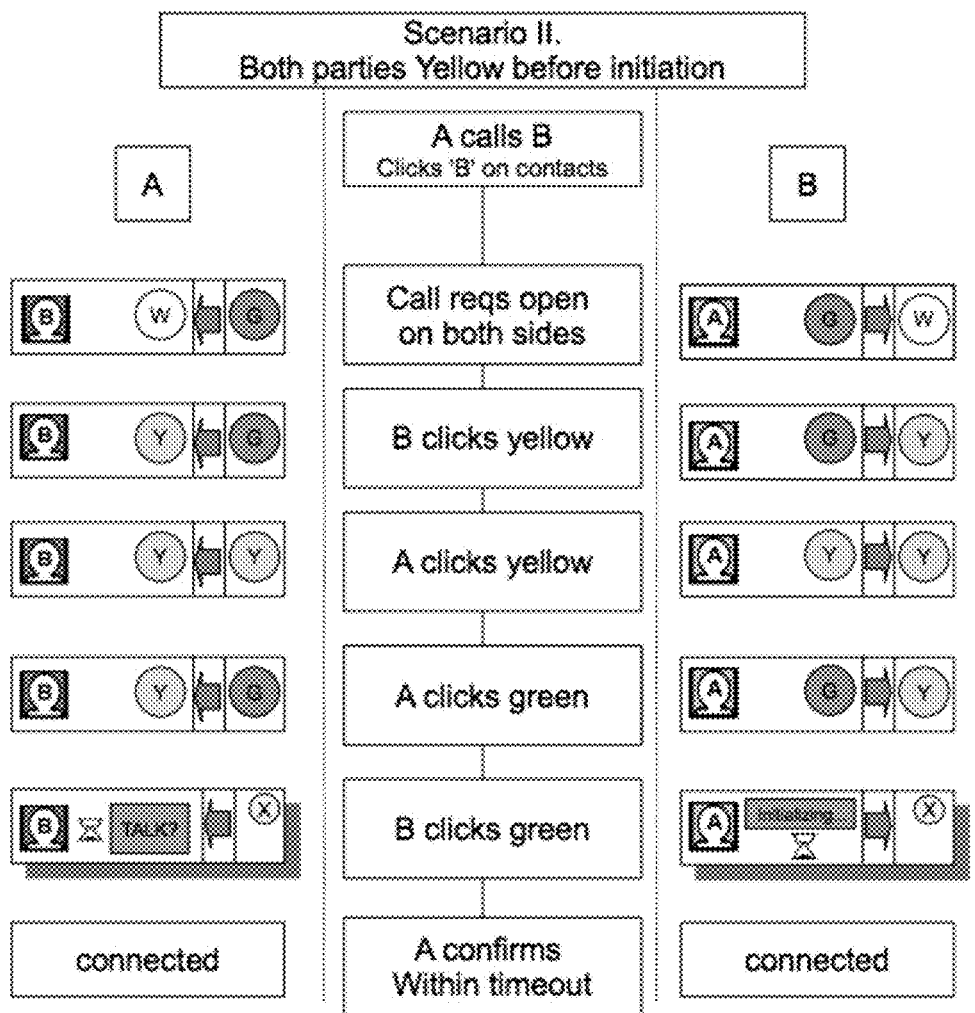
Figure 10C:
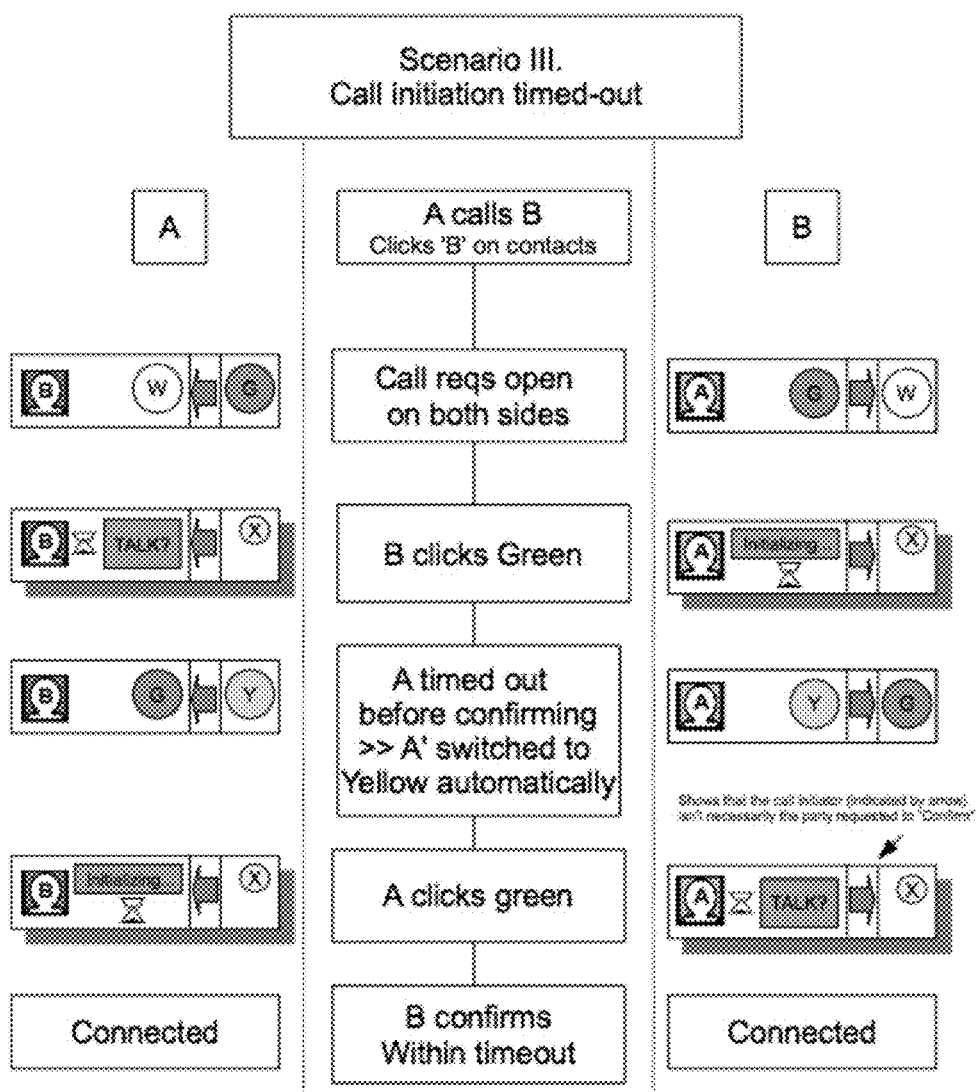

FIGS. 10A-C show possible scenarios between two users of the CCI system. In these figures, the left and right columns show the Call Requests appearing in each user's screen while the middle column explains the situation at hand. In FIG. 10A one possible simple scenario that can take place when using the inventive method is illustrated. Here party A is inviting party B. Thus party A by default gets a green status (since he is placing the call request, he obviously must be ready to speak). Party B meanwhile is White since nothing is known of his status. The next stage shows party B has clicked 'green', and therefore his status changes to green on both phones, and a CIA event is initiated. Thus the screen for both users shows a popup wherein on A's side the popup requests confirmation of party A, while the popup on B's screen simply notifies him of the event. If party A confirms within the timeout, the parties are connected using traditional telephony, VOIP, or other means as will be clear to one skilled in the art.

In FIG. 10B another possible scenario that can take place when using the inventive method is illustrated. Again party A is calling party B, and party A has a green status since he is placing the call request, while party B meanwhile is white since nothing is known of his status. Next, Party B responds to the Call Request, but declares a state of being temporarily unavailable by clicking Yellow. Subsequently, after an unknown period of time, Party A likewise becomes temporarily unavailable and hence clicks 'yellow'. Party A then becomes available again and clicks 'Green'. Subsequently party B also becomes available, clicks Green. A CIA event begins, where party A is requested to confirm his availability to talk. If party A confirms within the timeout, the parties are connected using traditional telephony, VOIP, or other means as will be clear to one skilled in the art.

In FIG. 10C yet another possible scenario that can take place when using the inventive method is illustrated. Again party A is calling party B, thus party A has a green status since he is placing the Call Request, while party B meanwhile is white since nothing is known of his status. Later, party B responds by clicking 'Green'. Since party A is also green, a CIA event begins, where party A is contacted for confirmation that he is indeed available to talk. However party A does not confirm within the timeout, and is switched to yellow automatically. Subsequently however party A becomes available once again, and clicks Green. A new CIA event begins, where the confirmation is now asked of party B since he is the earlier party to have become Green in this sequence. If party B now confirms within the time limit, the parties are connected using traditional telephony, VOIP, or other means as will be clear to one skilled in the art.

In the case that a call is received from a caller outside the system, in one embodiment the application running on the user's phone blocks any incoming call which has not been decided upon by the session initiation protocol described above. Only once the system reaches a situation where a voice call should be initiated between the two parties that have agreed on it (according to the CIA procedure presented above), will the system, in one possible embodiment, do the following. In the following process, we define the two parties of a successful CIA session presented above, such that the party that was last requested to confirm his availability to create the communication is termed "CIA confirmer" while the other party is termed "CIA initiator".

I. The system orders the CIA initiator phone to allow the CIA confirmer to call the CIA initiator's machine (or in the other order, according to the CCO element of the patent). This may be done by either allowing the particular number to get through the "blocking mode" (where possible). When not possible, the system will temporarily lift the blocking mode entirely to allow calls to be received. (In embodiments that don't use a "blocking mode" in the machine level, unauthorized incoming calls are cut off by said application, and this stage is redundant). In this possible embodiment, the system then automatically generates an outgoing call from the last confirmer's phone set, and orders the CIA initiator's phone set to accept and automatically answer the call. Thus, a simple and immediate flow is created between the system's decision to create a communication session and its actual creation, without further action requested to the part of the users. This embodiment is of course pending the system's technical control over the phone machine's telephony features in various platforms.

II. The system orders the phone of the CIA confirmer to place an outgoing call to the other party (the CIA initiator). Alternatively, in another embodiment, it may be defined that original call-requester's phone may be the one to make the outgoing call. This is pending considerations of marketing, billing, etc.

III. Once the call recipient's phone receives a call from the other party of a communication initiated by the said system, his machine automatically/immediately accepts the call, thus finalizing the creation of a communication session.

It is within provision of the invention to deal with cases where one or both of the parties are users of said system, yet they temporarily are not connected to the Internet (aka in smartphones in "data-only" mode, or the like). In such cases, the system makes use of SMS messaging to communicate between the application running on the user's phone unit (which is disconnected from the internet) as a replacement to the system's signaling via the internet. This uniquely designed codified SMS based protocol will notify a user of incoming Call Requests, and inform the system's server of the user's response to the Call Request, and his changes of status. Further, the system will cause the unblocking of the user's phone for a particular incoming call, and eventually bring about the initiation of a phone conversation.

The architecture listed above may not necessarily supply the fullest degree of privacy. This is since an external caller may recognize a different tonal signal when receiver is engaged in conversation as opposed to having his unauthorized call instantly cut off. However, it is within provision of the invention to utilize whatever functionality is made available by the various telephony service providers, in order to best minimize (or even eliminate) such drawbacks. For instance, the system may (by way of automation or guidance offered to the user) control the user's telephony account to eliminate the call waiting function on his phone. Thus incoming callers not using the inventive system will not in fact recognize if the called party is in another conversation.

Other telephony-service related functionality is voice mail. The system, in one embodiment, may provide that every cutoff incoming call will be instantly diverted to a voice mail recording notifying the caller of the user's use of said system and suggesting the best ways to communicate with him using said system. This is true for both cases of the user being engaged, or intentionally cut off by said system.

It is within provision of the invention that the user may choose not to actually allow callers to record voice mail. This functionality may in such cases be reserved solely for sounding the system's (or users own) recording to the caller.

Cooperation from Service Provider

If the system has obtained cooperation from one or more telephone service providers, it can be arranged for instance that some of the functionality discussed above will be orchestrated within (or in cooperation with) the telephone operating system of said providers. For instance no calls will be allowed to reach a particular user's machine except under certain conditions defined in real-time by the system (i.e. the core protocol described above). Implementing such decisions at the level of the service provider rather than in the level of the user's telephone unit may achieve better functionality in terms of privacy and faster more reliable service, amongst other factors.

Offline Functionality

It is within provision of the invention to deal with cases where one or both of the parties are users of said system, yet they temporarily are not connected to the Internet (aka in smartphones in "data-off, voice-off" mode, or the like). In such cases, the system may make use of coded SMS messaging to communicate between the application running on the user's phone unit (which is temporarily disconnected from the internet) as a replacement to the system's signaling via the internet. This uniquely designed codified SMS based protocol will notify a user of incoming Call Requests, and inform the system's server of the user's response to the Call Request, and his changes of status. Further, the system will cause the unblocking of the user's phone for a particular incoming call, and eventually bring about the initiation of a phone conversation.

Combined Module: Integrating CCI and CCO

The aforementioned Basic Module (CCO) and the Extended Module (CCI) may be integrated and used in parallel. This may be necessary in the case where the two different modules are in operation and serve different sets of users. This will create the need to integrate the two groups of users, thereby allowing communications between a CCO user and a CCI user to enjoy the advantages of CCO, while each party maintains the functionality and user experience of his module.

This may be done simply by allowing for CCO calls between users using CCO only, CCI for calls between CCI users, and CCO for calls between CCO and CCI users.

Special provision may be made for calls between nonusers (of either system) and users. For example calls from a nonuser to a CCO user may be reversed or not, or blocked depending on preset preference of the CCO user. Calls from a nonuser to a CCI user may be blocked, and indicated only as a Call Request to the CCI user.

FIG. 7 shows a matrix of possibilities for inviter-invitee combinations. The inviter (rows) may be a user of CCO, a user of CCI, or neither, as may the invitee (columns). The matrix gives the appropriate action for each case.

Figure 8:
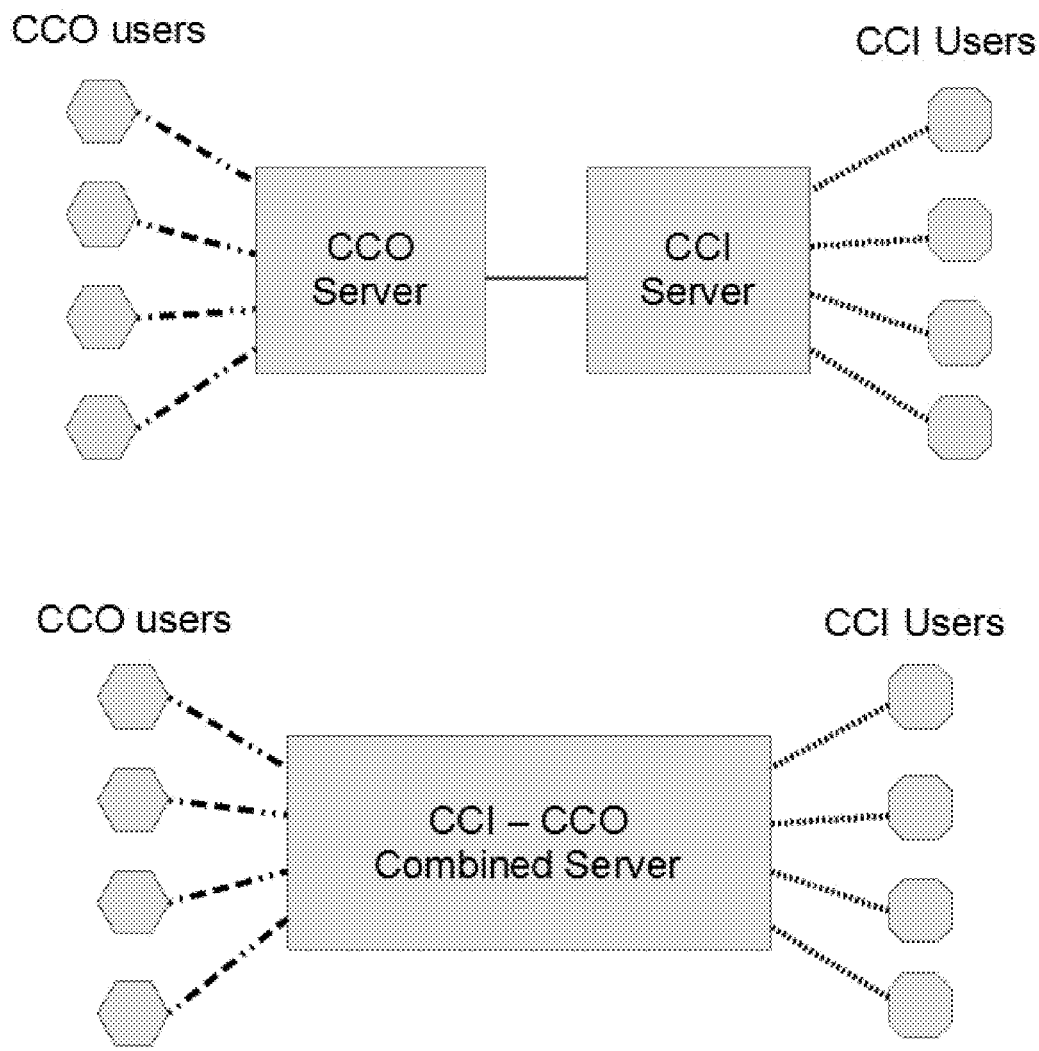
FIG. 8 illustrates possible server system configurations combining both CCI and CCO.

FIG. 8 shows system diagrams for two cases within provision of the invention. The top deals with the case that two separate servers are used, one for CCO users and one for CCI users. The bottom deals with the case that a single server is used.

Cooperation from Service Provider

If the system has obtained cooperation from one or more telephone service providers, it can be arranged for instance that some of the functionality discussed above will be orchestrated within (or in cooperation with) the telephone operating system of said providers. For instance no calls will be allowed to reach a particular user's machine except under certain conditions defined in real-time by the system (i.e. the core protocol described above). Implementing such decisions at the level of the service provider rather than at the level of the user's telephone unit may achieve better functionality in terms of privacy, speed, and reliability, amongst other factors.

Further Embodiments

The system is primarily designed for use in conjunction with mobile telephony systems. Yet it is possible to adapt the method for use with fixed line phones (aka 'land lines'). This may be accomplished by use of designated IP connected phones. Beyond connection to a telecommunications provider (traditional or VOIP), an IP connection (Wi-Fi or other) and some computing capability must be available on this device, optionally with a screen and user interface (e.g., a smartphone). Such a phone will enable the inventive protocol to control the negotiation of events towards establishing a voice conversation in similar fashion as described above for the mobile case.

It is within provision of the invention that three or more parties may be connected using the inventive method, employing largely the same system described above. This can be accomplished using means for introducing further participants, such as a window in which any current user chooses a number of intended participants. Then between each participant and the initiator, the same methodology described above is implemented.

In other embodiments, the system may enable users to coordinate and schedule a preferred time for their session. This may be done by either sharing their calendars (possibly via API's with external calendar systems), or by manually coordinating the preferred time slot for both parties. In such cases, both parties may be reminded at the set time that they have a call appointment on said system. Alternatively, system may be designed to automatically initiate a session between two parties at the time they have scheduled, requiring them only to confirm.

Another possibility is to allow for people engaged in a call to invite further participants again using the same methodology described above for initiating a call between two parties.

A further case would be when one is in a current conversation and receives a call request from a third party. Provision can be made to add this new caller to the current ongoing call, thus implementing a multiparty call.

As mentioned above, there is provision in the invention to receive call notification through coded SMS messages for cases when a phone is not receiving data, or is not 3G connected, or the recipient and/or caller prefers to receive SMS than to use internet-based data transfer for other reasons. The application running on the user's unit will then translate such coded notifications into actual Call Requests, changing status (Green-Yellow-White) in accordance with the core protocol of said invention.

Related Embodiments

Any other means of asynchronous communication may be facilitated by the invention, including but not limited to: Instant messaging (IM, also known as SMS), voice messaging, video messages, while maintaining the core elements of the invention. This is achieved by allowing users to send messages to other users, within or without a Call Request. The user who sends a message will receive an indication when the message has been uploaded to the server, and receives replies mediated by the server.

The invention is not limited to mobile phones. It can also be implemented in landline phones of all sorts, computer based VOIP applications etc., providing the phone unit has Internet connectivity. This can also be done by designing a unique landline phone unit that has a unique user interface designed for communication with said system.

Even in phone units which lack internet access (such as landline or computer based lines) temporarily or even permanently, at least part of the functionality of CCI can be provided (as shown for example in FIG. 6). This will allow such a phone unit to be compatible with the CCI protocol, and thus able to communicate with other CCI-connected units. This can be done by loading the phone unit with the contacts list, as well CCI-related data regarding each user.

The foregoing description and illustrations of the embodiments of the invention has been presented for the purposes of illustration. It is not intended to be exhaustive or to limit the invention to the above description in any form.

Any term that has been defined above and used in the claims, should be interpreted according to this definition.

The reference numbers in the claims are not a part of the claims, but rather used for facilitating the reading thereof. These reference numbers should not be interpreted as limiting the claims in any form.

In another embodiment of the said CCI invention, user may be allowed to define special treatment to particular contacts or groups of contacts. These may include a list of contacts which upon receiving Call Request from, user will always automatically be switched to Green status. Alternatively, user may define unique notification sounds and methods for particular contacts, for example, when spouse or child sends a Call Request, user may receiving a prolonged sound notification until he responds (much like an alarm).

The foregoing description and illustrations of the embodiments of the invention has been presented for the purposes of illustration. It is not intended to be exhaustive or to limit the invention to the above description in any form.

Any term that has been defined above and used in the claims, should be interpreted according to this definition.

The reference numbers in the claims are not a part of the claims, but rather used for facilitating the reading thereof. These reference numbers should not be interpreted as limiting the claims in any form.

The invention claimed is:

1. A method for coordinated call initiation between a first party and a second party comprising steps of:
   a. sending a call request from a first party to a second party;
   b. providing asynchronous means free of time limitations for said second party to respond to said call request, by means selected from the group consisting of:
      ignoring said call request;
      acknowledging said call request, including indicating a status of 'temporarily unavailable';
      acknowledging said call request, including indicating a status of 'currently available';
      removing said call request from a list of open requests without notifying said first party; and
      cancelling said call request and informing said first party of the cancellation;
   c. providing means for said first party to switch between temporarily unavailable status and currently available status, once said call request has been sent, or cancelling the call and informing said second party of the cancellation;
   d. initiating a synchronous call initiation event (CIA), corresponding to a call request, by the system at the first opportunity that both said first party and said second party concurrently indicate 'currently available' status, wherein within a timeout limit the earlier party of said first party or said second party is requested to confirm availability to participate in a phone session, and wherein:
      i. if said earlier party of said first party or said second party confirms within said time limit, a phone session is implemented between said first party and said second party, while;
      ii. if said earlier party of said first party or said second party fails to respond within said time limit, the call reverts to pending status and the status of said earlier party of said first party or said second party turns to 'temporarily unavailable' automatically, and;
      iii. whenever either of said first party or said second party cancels the synchronous call initiation (CIA) event, the status of said first party or said second party moves to 'temporarily unavailable' and said call request remains open;

wherein said method implements an asynchronous call initiation scheme that prevents unauthorized phone interruption, and wherein said first party initiating the call request cannot glean any information about the status of the second party without explicit action of the second party.

2. A system for coordinated call initiation between a first party and a second party comprising
   a. a server;
   b. an application running on a computerized device with internet connectivity including a smartphone;
   c. means for sending a call request from a first party to a second party;
   d. means for said second party to respond to said call request by means selected from the group consisting of:
      ignoring said call request;
      acknowledging said call request, including indicating a status of 'temporarily unavailable';
      acknowledging said call request including indicating a status of 'currently available';
      removing said call request from a list of open requests without notifying said first party; and
      cancelling said call request and informing the first party of the cancellation;
   e. means for both of said first party and said second party to switch from 'temporarily unavailable' status to 'currently available' status once said call request has been sent;
   f. means for initiating a synchronous call initiation event, corresponding to a call, at the first opportunity that both of said first party and said second party concurrently indicate 'currently available' status, wherein within a timeout limit the earlier party of said first party or said second party to be currently available is requested to confirm his availability to participate in a phone session, and wherein:
      i. said earlier party of said first party or said second party confirms within said time limit, a phone session is implemented between said first party and said second party, while
      ii. if said earlier party of said first party or said second party fails to respond within said time limit, the call reverts to pending status and the status of said earlier party of said first party or said second party turns to 'temporarily unavailable' automatically, and,
      iii. whenever any party of said first party or said second party cancels the synchronous call initiation event, the status of said first party or said second party moves to 'temporarily unavailable'.

* * * * *